(12) United States Patent
Richardson et al.

(10) Patent No.: US 8,743,823 B2
(45) Date of Patent: Jun. 3, 2014

(54) TRANSMISSION WITH COLLISION DETECTION AND MITIGATION FOR WIRELESS COMMUNICATION

(75) Inventors: Thomas Richardson, South Orange, NJ (US); Xinzhou Wu, Monmouth Junction, NJ (US); Ying Wang, Easton, PA (US); Saurabh Tavildar, Jersey City, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1018 days.

(21) Appl. No.: 12/370,092

(22) Filed: Feb. 12, 2009

(65) Prior Publication Data

US 2010/0202400 A1   Aug. 12, 2010

(51) Int. Cl.
  H04W 4/00       (2009.01)
  H04W 72/04      (2009.01)
  H04W 74/08      (2009.01)

(52) U.S. Cl.
  CPC ...... *H04W 72/0446* (2013.01); *H04W 74/0825* (2013.01)
  USPC .......................................... 370/330; 370/468

(58) Field of Classification Search
  CPC ..................... H04W 72/0446; H04W 74/0825
  USPC ................. 370/328–333, 335–337, 340–345, 370/436–437, 441–445, 447, 465, 468, 370/478–480
  See application file for complete search history.

(56) References Cited

U.S. PATENT DOCUMENTS

| | | | |
|---|---|---|---|
| 6,791,995 B1 * | 9/2004 | Azenkot et al. | 370/436 |
| 6,963,540 B2 * | 11/2005 | Choi et al. | 370/252 |
| 7,142,553 B1 * | 11/2006 | Ojard et al. | 370/421 |

(Continued)

FOREIGN PATENT DOCUMENTS

| | | |
|---|---|---|
| CN | 1855745 A | 11/2006 |
| EP | 0170960 B1 | 1/1989 |

(Continued)

OTHER PUBLICATIONS

Andras Racz et al: "On the Impact of Inter-Cell Interference in LTE" Global Telecommunications Conference, 2008. IEEE GLOBECOM 2008. IEEE, IEEE, Piscataway, NJ, USA, Nov. 30, 2008, pp. 1-6, XP031370721 ISBN: 978-1-4244-2324-8 figure 1.

(Continued)

*Primary Examiner* — Kevin Mew
(74) *Attorney, Agent, or Firm* — James K. O'Hare

(57) ABSTRACT

Techniques for transmitting signals on shared resources in a manner to detect and/or combat collision are described. In an aspect, a terminal may transmit a signal on a subset of resource elements in a resource block, and at least one null resource element with no signal may be used to detect for collision of the signal. In another aspect, different terminals may simultaneously transmit their signals on different subsets of resource elements in a resource block. These different subsets of resource elements may be pseudo-randomly selected to randomize interference. In one design, a terminal may determine a resource block to use for transmission of a signal, select a subset of the resource elements in the resource block, and transmit the signal on the selected resource elements, e.g., to at least one other terminal for peer-to-peer communication. The signal may be a peer discovery signal, a paging signal, etc.

30 Claims, 8 Drawing Sheets

(56) References Cited

U.S. PATENT DOCUMENTS

| | | | |
|---|---|---|---|
| 7,233,577 B2 * | 6/2007 | Choi et al. | 370/252 |
| 7,263,377 B1 * | 8/2007 | Wahlstrom et al. | 455/512 |
| 7,415,548 B2 * | 8/2008 | Mahany et al. | 710/18 |
| 7,522,552 B2 * | 4/2009 | Fein et al. | 370/328 |
| 7,609,752 B2 * | 10/2009 | Fujii et al. | 375/145 |
| 7,876,701 B2 | 1/2011 | Li et al. | |
| 8,274,961 B2 * | 9/2012 | Sakoda et al. | 370/349 |
| 8,300,715 B2 | 10/2012 | Li et al. | |
| 8,331,249 B2 | 12/2012 | Li et al. | |
| 8,331,965 B2 * | 12/2012 | Richardson | 455/501 |
| 8,432,786 B2 | 4/2013 | Li et al. | |
| 2001/0046220 A1 * | 11/2001 | Koo et al. | 370/335 |
| 2003/0103476 A1 * | 6/2003 | Choi et al. | 370/329 |
| 2003/0137989 A1 * | 7/2003 | Nagai | 370/455 |
| 2003/0142646 A1 * | 7/2003 | Paneth et al. | 370/330 |
| 2003/0203735 A1 | 10/2003 | Andrus et al. | |
| 2006/0072450 A1 * | 4/2006 | Miyoshi et al. | 370/205 |
| 2007/0110020 A1 * | 5/2007 | Kroeger et al. | 370/343 |
| 2007/0230431 A1 | 10/2007 | Driesen et al. | |
| 2008/0130770 A1 | 6/2008 | Khandekar et al. | |
| 2009/0016285 A1 | 1/2009 | Li et al. | |
| 2010/0040015 A1 * | 2/2010 | Ernstrom et al. | 370/330 |
| 2010/0110999 A1 * | 5/2010 | Li et al. | 370/329 |
| 2013/0064187 A1 * | 3/2013 | Patil et al. | 370/329 |

FOREIGN PATENT DOCUMENTS

| | | |
|---|---|---|
| EP | 0854619 A1 | 7/1998 |
| EP | 1170916 A1 | 1/2002 |
| EP | 1605721 A1 | 12/2005 |
| EP | 1710960 A2 | 10/2006 |
| JP | 2006295932 A | 10/2006 |
| WO | 2005006699 A1 | 1/2005 |
| WO | WO2009009537 | 1/2009 |

OTHER PUBLICATIONS

International Search Report and Written Opinion—PCT/US2010/024030, International Search Authority—European Patent Office—Jul. 1, 2010.

Partial International Search Report—PCT/US10/024030, International Searching Authority—European Patent Office, May 10, 2010.

* cited by examiner

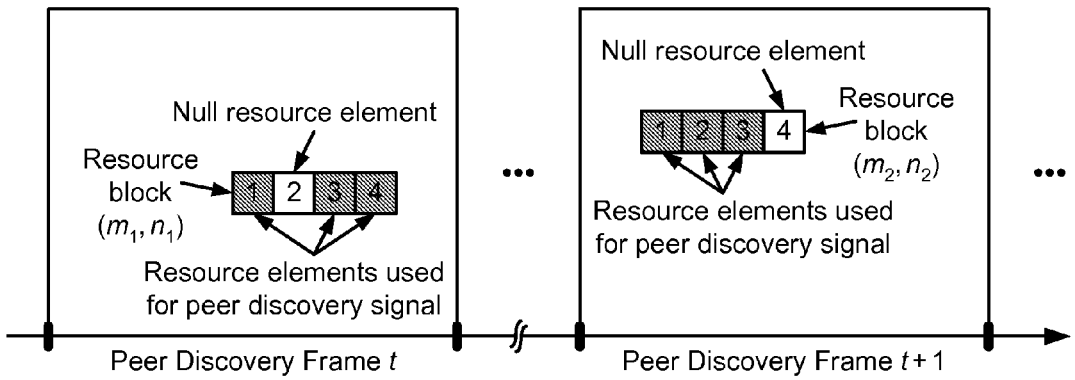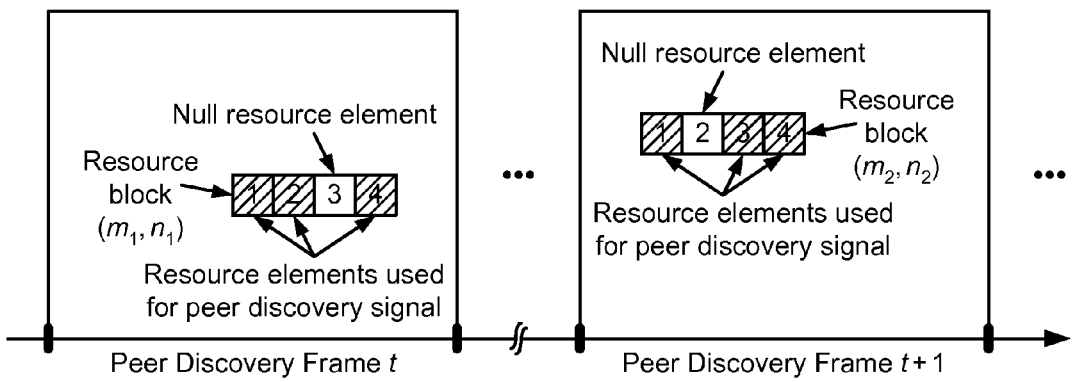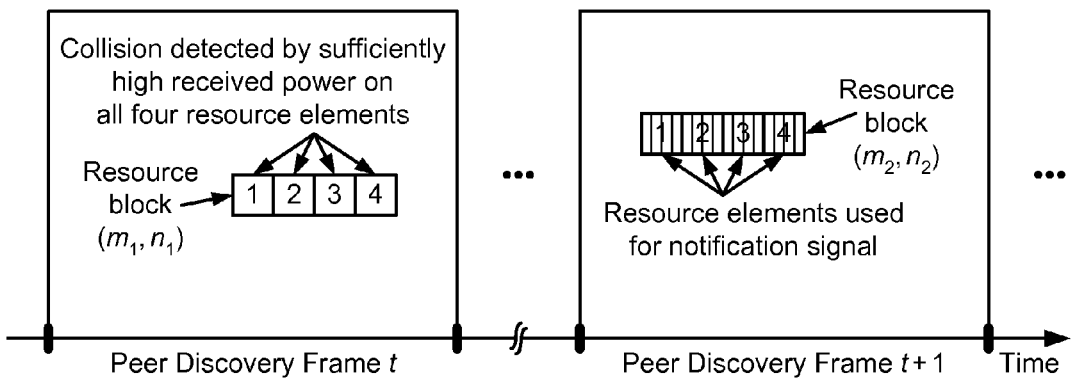
FIG. 4

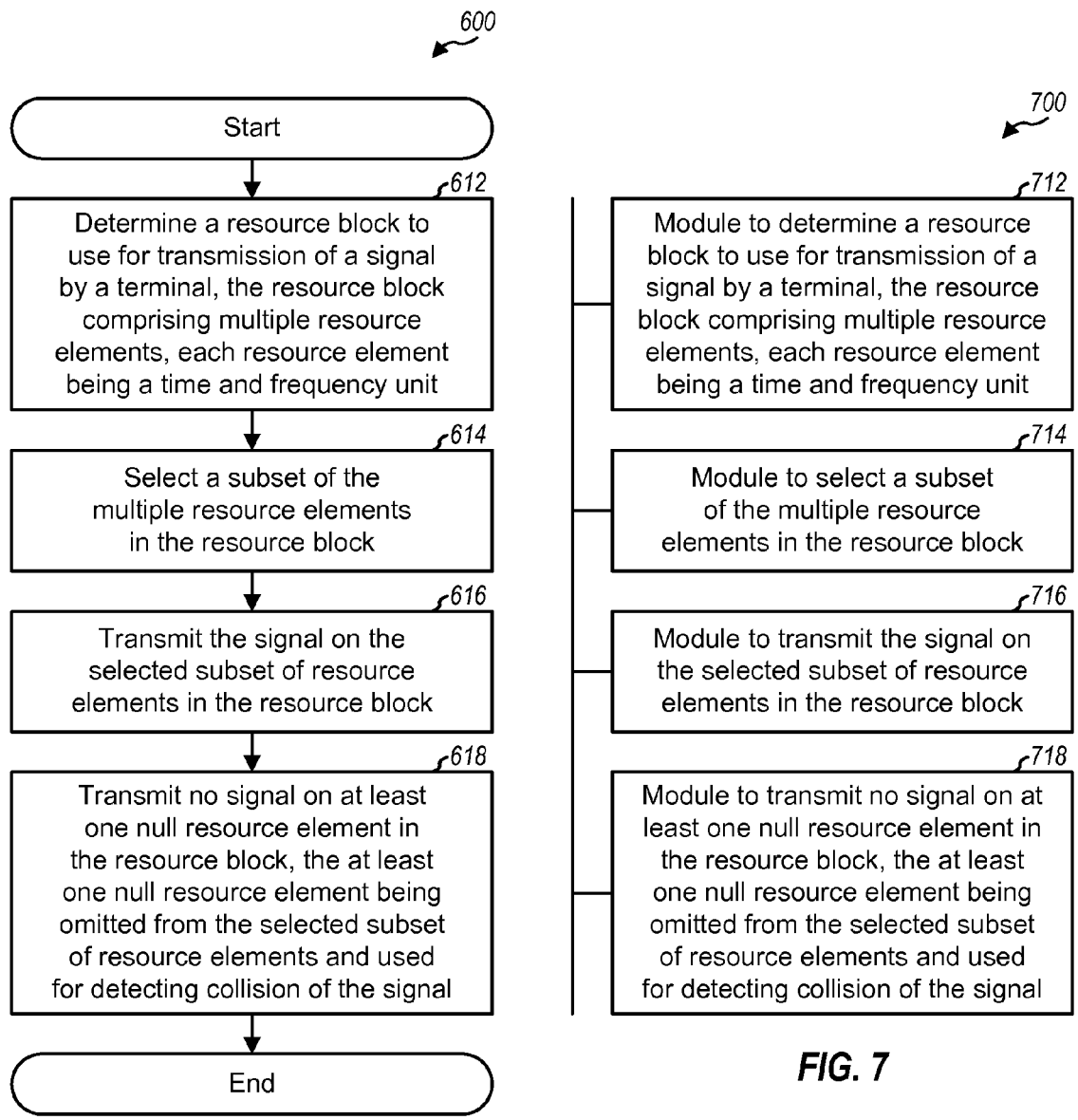

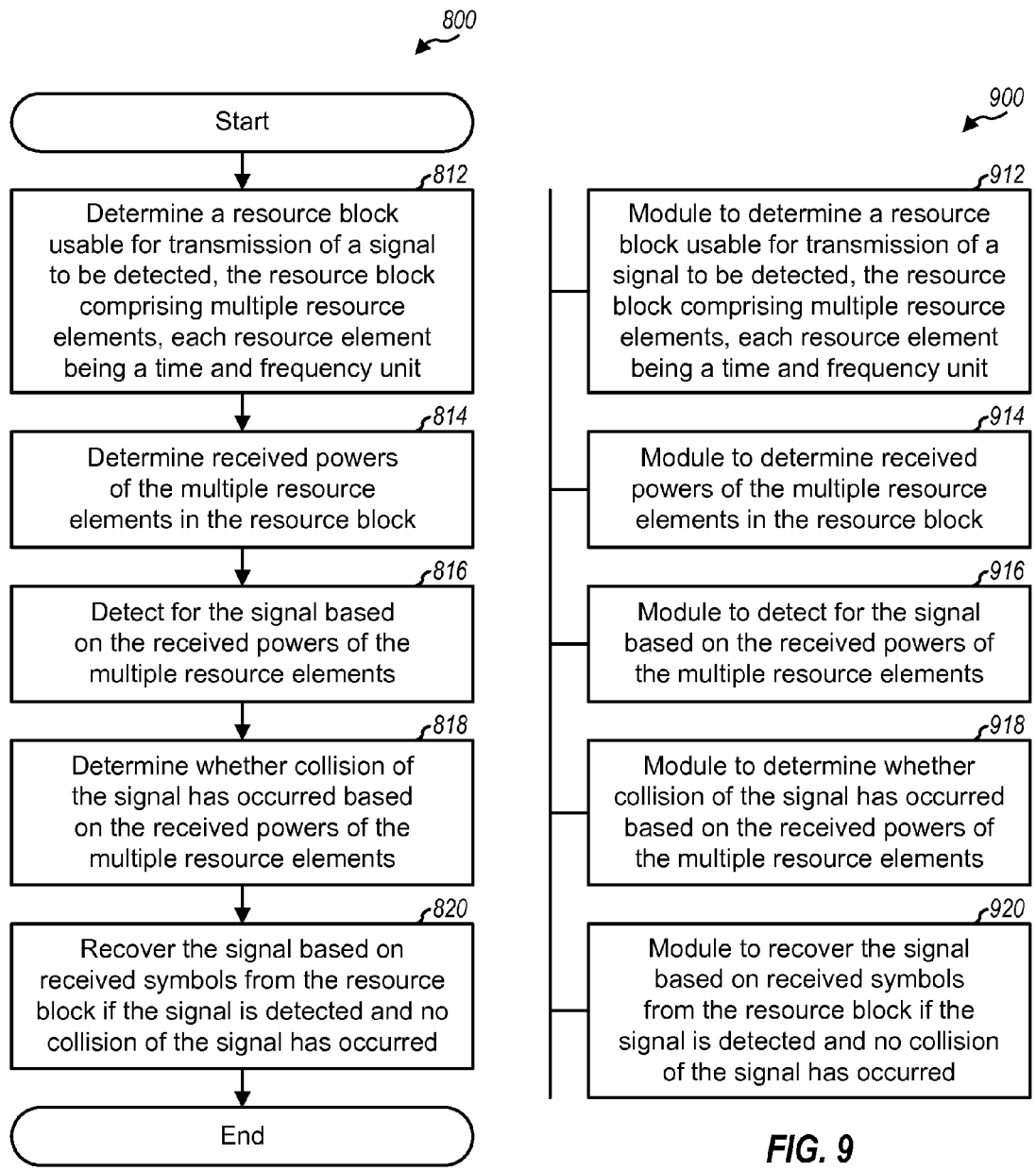

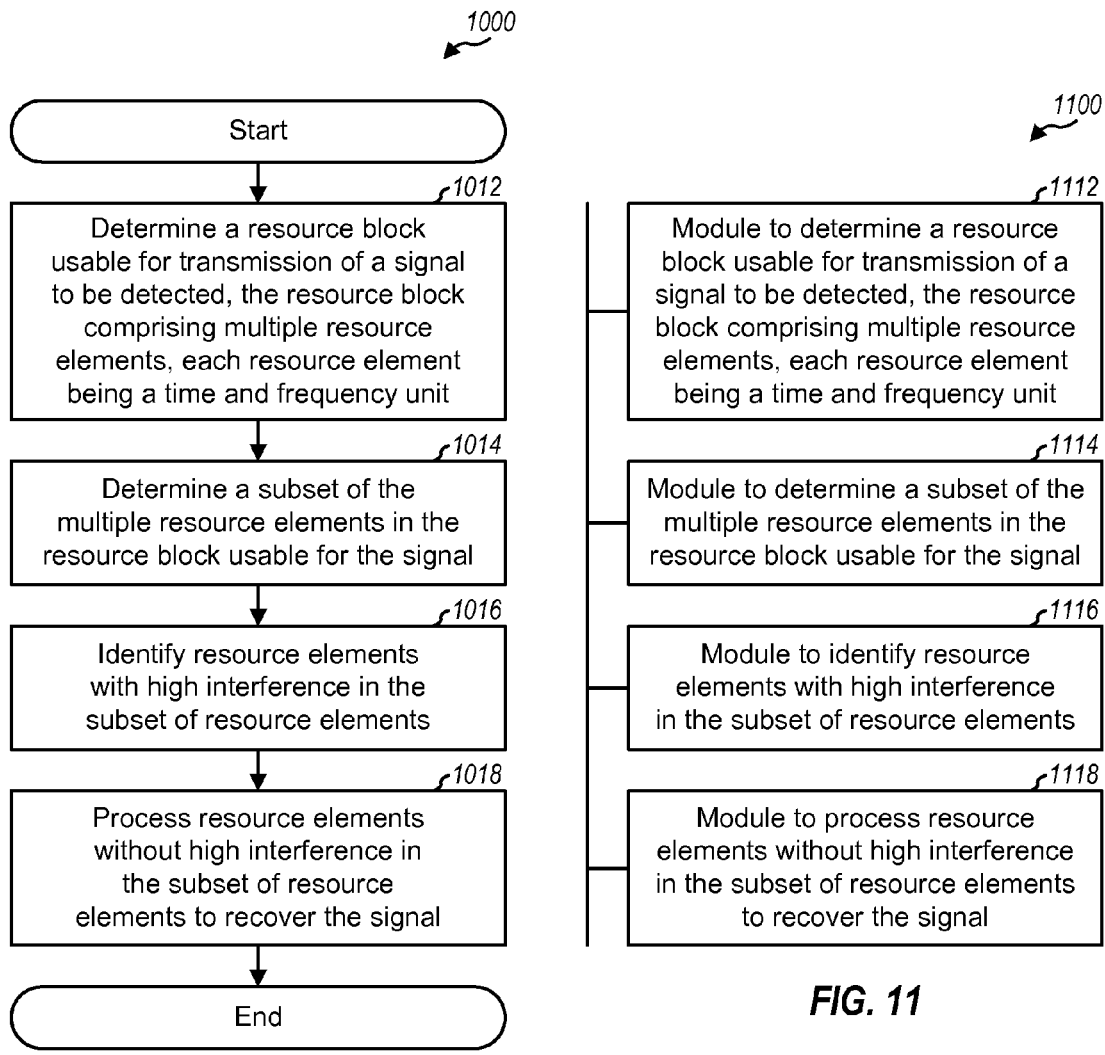

TRANSMISSION WITH COLLISION DETECTION AND MITIGATION FOR WIRELESS COMMUNICATION

BACKGROUND

I. Field

The present disclosure relates generally to communication, and more specifically to transmission techniques for wireless communication.

II. Background

Wireless communication networks are widely deployed to provide various communication services such as voice, video, packet data, messaging, broadcast, etc. These wireless networks may be capable of supporting communication for multiple users by sharing the available network resources. Examples of such wireless networks include wireless wide area networks (WWANs), wireless metropolitan area networks (WMANs), and wireless local area networks (WLANs).

In a wireless communication network, a terminal may transmit a signal on radio resources shared with other terminals. The signal transmitted by the terminal on the shared resources may collide with signals transmitted by other terminals. A collision occurs when multiple terminals use the same radio resources to transmit their signals, and these signals may interfere with one another. It is desirable to efficiently transmit signals on shared resources.

SUMMARY

Techniques for transmitting signals on shared resources in a manner to detect and/or combat collisions are described herein. In an aspect, a terminal may transmit a signal on a subset of resource elements in a resource block, and at least one null resource element with no signal may be used to detect for collision of the signal. In another aspect, different terminals may simultaneously transmit their signals on different subsets of resource elements in a resource block. These different subsets of resource elements may be pseudo-randomly selected to randomize interference.

In one design, a terminal may determine a resource block to use for transmission of a signal by the terminal. The resource block may include multiple resource elements, and each resource element may be a time and frequency unit. The terminal may select a subset of the multiple resource elements in the resource block. The terminal may then transmit the signal on the selected subset of resource elements in the resource block, e.g., to at least one other terminal for peer-to-peer communication.

In one design, the signal may be a peer discovery signal transmitted by the terminal to indicate the presence of the terminal. The terminal may transmit no signal on at least one null resource element in the resource block. The null resource element(s) would be omitted from the selected subset of resource elements and may be used for detecting collision of the signal. The terminal may determine whether a collision has occurred based on received power of the null resource element(s).

In another design, the signal may be a paging signal sent to another terminal, e.g., to page or send information to that terminal. The recipient terminal may detect high interference on some of the resource elements in the selected subset of resource elements. The recipient terminal may decode received symbols from resource elements without high interference and erasures for resource elements with high interference to recover the paging signal.

Various aspects and features of the disclosure are described in further detail below.

BRIEF DESCRIPTION OF THE DRAWINGS

FIG. 4 shows transmission of peer discovery signals by two terminals.
FIG. 6 shows a process for transmitting a signal.
FIG. 7 shows an apparatus for transmitting a signal.
FIG. 8 shows a process for receiving a signal.
FIG. 9 shows an apparatus for receiving a signal.
FIG. 10 shows a block diagram of two terminals.
FIG. 11 shows a design of an apparatus for receiving a signal.

DETAILED DESCRIPTION

The transmission techniques described herein may be used for various wireless communication networks such as WWANs, WMANs, WLANs, etc. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Universal Terrestrial Radio Access (UTRA), cdma2000, etc. A TDMA network may implement a radio technology such as Global System for Mobile Communications (GSM). An OFDMA network may implement a radio technology such as Evolved UTRA (E-UTRA), Ultra Mobile Broadband (UMB), Flash-OFDM®, etc. Long Term Evolution (LTE) is an upcoming release of "3rd Generation Partnership Project" (3GPP) that uses E-UTRA, which employs OFDMA on the downlink and SC-FDMA on the uplink. A WLAN may implement one or more standards in the IEEE 802.11 family of standards (which is also referred to as Wi-Fi), Hiperlan, etc. A WMAN may implement one or more standards in the IEEE 802.16 family of standards (which is also referred to as WiMAX). The transmission techniques described herein may be used for the wireless networks and radio technologies mentioned above as well as other wireless networks and radio technologies.

Figure 1:
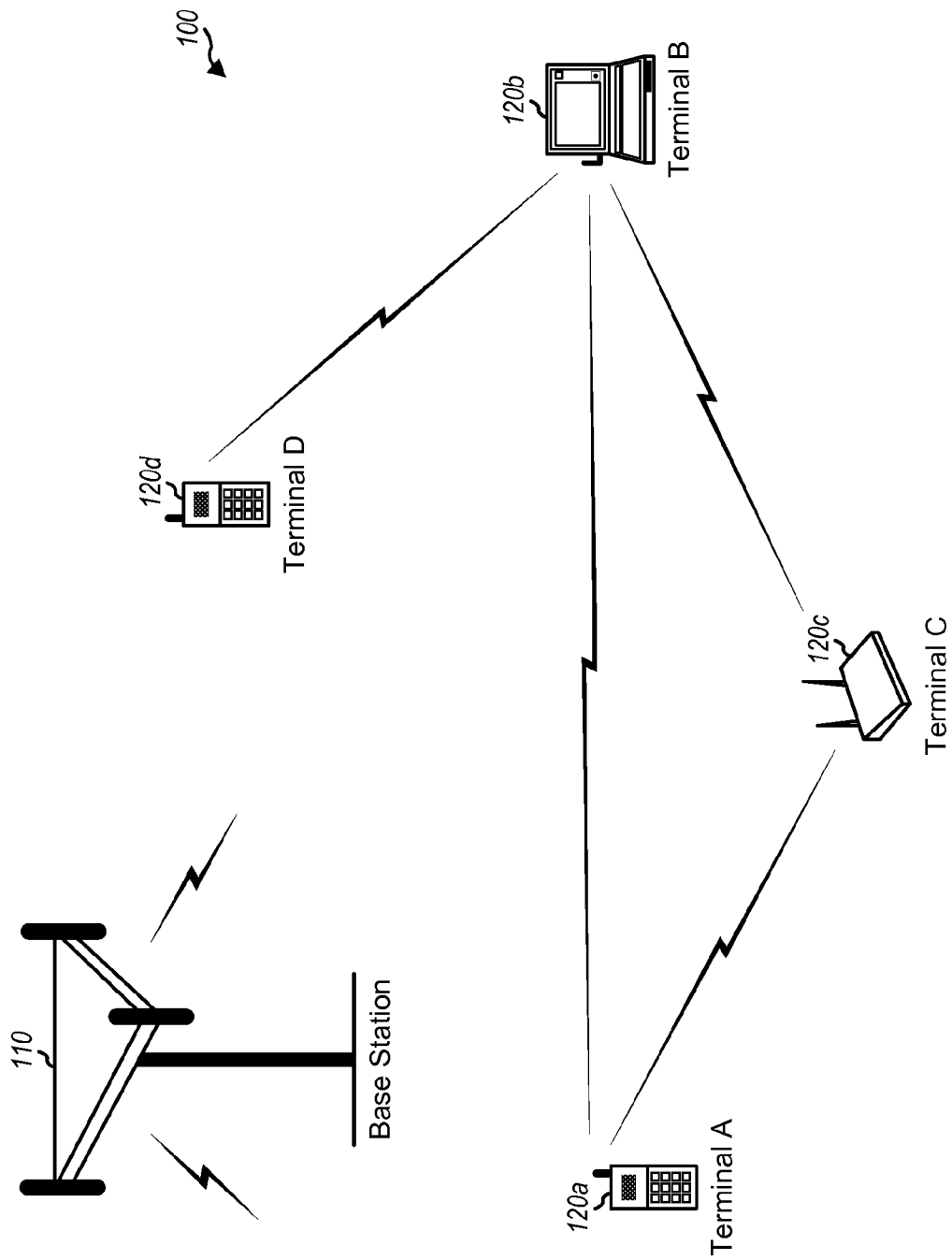
FIG. 1 shows a wireless communication network.

FIG. 1 shows a wireless communication network 100, which may include any number of base stations and any number of terminals. For simplicity, only one base station 110 and four terminals 120a, 120b, 120c and 120d are shown in FIG. 1. A base station may be a station that communicates with the terminals and may also be referred to as an access point, a Node B, an evolved Node B (eNB), etc. A base station may provide communication coverage for a particular geographic area. The term "cell" can refer to a coverage area of a base station and/or a base station subsystem serving the coverage area.

Terminals 120 may be dispersed throughout the network, and each terminal may be stationary or mobile. A terminal may also be referred to as an access terminal, a mobile station, a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station and/or may receive information (e.g., timing information) from the base station. Alternatively or additionally, the terminal may communicate peer-to-peer with other terminals.

Figure 2:
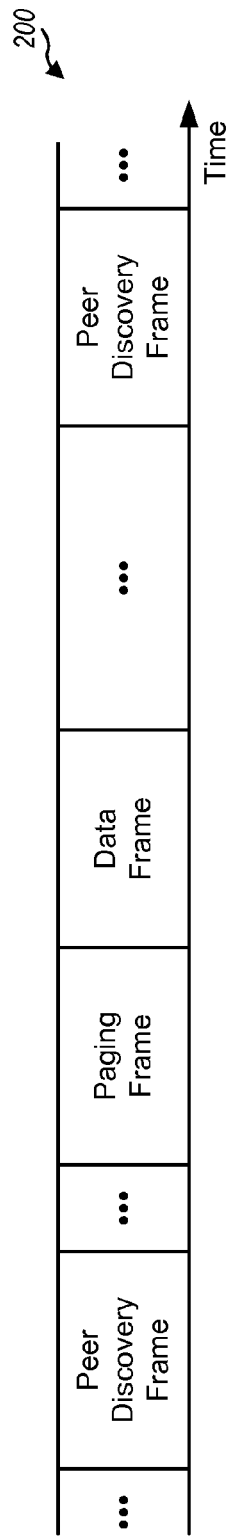
FIG. 2 shows an exemplary transmission structure.

FIG. 2 shows a design of a transmission structure 200 that may be used for wireless network 100. The transmission timeline may be partitioned into units of frames. Each frame may cover a fixed or variable time duration, e.g., 1 millisecond (ms), etc. In the design shown in FIG. 2, different types of information may be sent in different frames. Some frames may be used to transmit peer discovery signals and may be referred to as peer discovery frames. Some frames may be used to transmit paging signals and may be referred to as paging frames. Many or most frames may be used to transmit data and may be referred to as data frames. Other types of frames may also be defined. The peer discovery frames may be spaced apart by $T_{PD}$ seconds, which may be a suitably selected duration. The paging frames may be spaced apart by $T_P$ seconds, which may also be a suitably selected duration. The different types of frames may have different periodicity.

Figure 3:
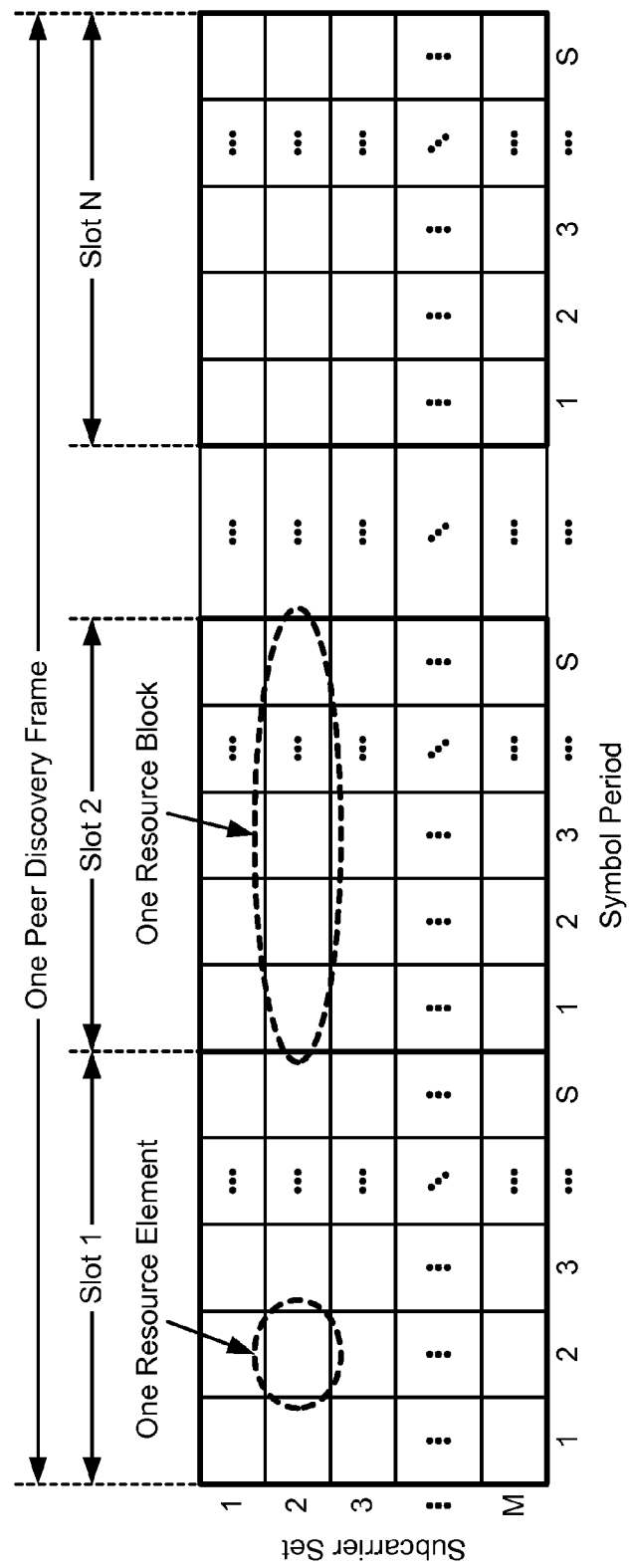
FIG. 3 shows an exemplary peer discovery frame.

FIG. 3 shows a design of a peer discovery frame that may be used to transmit peer discovery signals. In this design, the peer discovery frame may be partitioned into N slots with indices of 1 through N, where N may be any integer value. Each slot may include S symbol periods with indices of 1 through S, where S may be any integer value. The N slots may be contiguous (as shown in FIG. 3) or may be separated in time (not shown in FIG. 3).

The available system bandwidth may be partitioned into multiple (K) subcarriers with orthogonal frequency division multiplexing (OFDM), single-carrier frequency division multiplexing (SC-FDM), or some other multiplexing scheme. M subcarrier sets with indices of 1 through M may be defined, where M may be any integer value equal to or less than K. Each subcarrier set may include one subcarrier or multiple contiguous or non-contiguous subcarriers.

Resource elements may be defined based on the available time and frequency units in the peer discovery frame. A resource element is the smallest unit of time and frequency that may be used for transmission. In one design, a resource element may cover one subcarrier in one symbol period and may be used to send one modulation symbol, which may be a real or complex value. In one design, each subcarrier set includes one subcarrier, S*M resource elements are available in each slot, and S*M*N resource elements are available in the peer discovery frame.

Resource blocks may be defined based on the available resource elements. A resource block is a block of time and frequency resources that may be selected for use and includes multiple resource elements. A resource block may also be referred to as a segment, a time frequency block, a tile, etc. In the design shown in FIG. 3, a resource block covers one subcarrier set in S symbol periods of one slot. In this design, M resource blocks are available in each slot, and a total of M*N resource blocks are available in the peer discovery frame.

In one exemplary design, a peer discovery frame covers 56 subcarrier sets in 64 slots, each slot includes 11 symbol periods, and each subcarrier set includes one subcarrier. The peer discovery frame includes a total of 3584 resource blocks, each resource block includes 11 resource elements, and each resource element corresponds to one subcarrier in one symbol period. The peer discovery frame, the resource blocks, and the resource elements may also have other dimensions.

In general, a resource element may have any dimension of time and frequency, and a resource block may also have any dimension and include any number of resource elements. For clarity, much of the description below assumes that (i) a resource element covers one subcarrier set in one symbol period and (ii) a resource block covers one subcarrier set in one slot and includes S resource elements. Each resource block in a peer discovery frame may be uniquely identified by an index (m, n), which is composed of a subcarrier set index m and a slot index n. Each resource element in a given resource block may be identified by a resource element index s.

For peer-to-peer communication, a terminal may announce its presence to other terminals within its vicinity by periodically transmitting a peer discovery signal. The terminal may also detect for the presence of other terminals within its vicinity based on peer discovery signals transmitted by these other terminals. In one design, the terminal may select a specific resource block to use to transmit its peer discovery signal in each peer discovery frame. The resource block selection may be based on an identifier (ID) of the terminal or some other ID and/or may be based on a hopping function that is known by the terminal as well as other terminals in the vicinity. The terminal may select pertinent parameter values for the hopping function, e.g., when the terminal initially powers up or moves into a new area. The terminal may then periodically transmit its peer discovery signal on a selected resource block in each peer discovery frame.

A single terminal may select a given resource block and may transmit its peer discovery signal on this resource block. In this case, other terminals may be able to correctly decode the peer discovery signal from this terminal. However, multiple terminals may select the same resource block and may transmit their peer discovery signals on this resource block. The selection of the same resource block may result from the multiple terminals not knowing the presence of one another, e.g., due to being far apart, or transmitting on the same resource block and being able to only transmit or receive at any given moment with half-duplex operation. A collision occurs when the multiple terminals transmit their peer discovery signals on the same resource block. These peer discovery signals may interfere one other at a receiving terminal and may not be decodable by the receiving terminal.

In an aspect, a terminal may transmit its peer discovery signal on a subset of resource elements in a resource block. At least one resource element in the resource block may be left unused, and each unused resource element may be referred to as a null resource element. The null resource element(s) may be selected pseudo-randomly or as a function of an ID and time and may be used to detect for collision of the peer discovery signal.

FIG. 4 shows an exemplary transmission of peer discovery signals by two terminals A and B. In this example, each resource block includes four resource elements 1 through 4. Each terminal selects a specific resource block to use in each peer discovery frame. Each terminal further selects three resource elements to use from among the four resource elements in a selected resource block.

In the example shown in FIG. 4, terminals A and B both select the same resource block $(m_1, n_1)$ from among all available resource blocks in peer discovery frame t. Terminal A selects resource elements 1, 3 and 4 for use, and resource element 2 is a null resource element. Terminal A transmits its peer discovery signal on resource elements 1, 3 and 4 and transmits no signal on null resource element 2. Terminal B selects resource blocks 1, 2 and 4 for use, and resource element 3 is a null resource element. Terminal B transmits its peer discovery signal on resource elements 1, 2 and 4 and transmits no signal on null resource element 3.

Terminal C may receive the peer discovery signals from both terminals A and B on resource block $(m_1,n_1)$ in peer discovery frame t. Terminal C expects one null resource element in resource block $(m_1,n_1)$ if there is no collision and further expects low received power on this null resource element. Terminal C may or may not have prior knowledge on the positions of the null resource elements. In the example shown in FIG. 4, terminal C receives the peer discovery signals from both terminals A and B on resource elements 1 and 4. Terminal C receives the peer discovery signal from terminal A on resource element 2 and receives the peer discovery signal from terminal B on resource element 3.

If only terminal A had transmitted its peer discovery signal on resource block $(m_1,n_1)$, then terminal C may obtain high received power on only resource elements 1, 3 and 4. Similarly, if only terminal B had transmitted its peer discovery signal on resource block $(m_1,n_1)$, then terminal C may obtain high received power on only resource elements 1, 2 and 4. However, if terminal C obtains high received power on each of the four resource elements in resource block $(m_1, n_1)$, as shown in FIG. 4, then terminal C can detect that a collision has occurred between at least two terminals. The detection of a null resource element in resource block $(m_1,n_1)$ would not guarantee that no collision has occurred, since terminals A and B can (by chance) select the same null resource element. However, detection of no null resource element in resource block $(m_1,n_1)$ may indicate high likelihood of collision.

In the example shown in FIG. 4, terminals A and B both select the same resource block $(m_2,n_2)$ in the next peer discovery frame t+1. This may be the case, for example, if both terminals A and B use the same hopping function and the same parameter values. Terminal A selects resource elements 1, 2 and 3 for use, transmits its peer discovery signal on resource elements 1, 2 and 3, and transmits no signal on null resource element 4. Terminal B selects resource elements 1, 3 and 4 for use, transmits its peer discovery signal on resource elements 1, 3 and 4, and transmits no signal on null resource element 2.

Receiving terminal C may use the null resource elements to detect for collision of peer discovery signals transmitted by multiple terminals A and B on the same resource block. In one design, terminal C simply discards the resource block with detected collision and processes the next peer discovery frame to detect for peer terminals. In another design, terminal C may inform terminals A and B of the detected collision. Terminal C may know the hopping function used by terminals A and B to select resource block $(m_1,n_1)$ in peer discovery frame t. Terminal C may use this hopping function to determine that resource block $(m_2,n_2)$ will be selected by terminals A and B in the next peer discovery frame t+1. Terminal C may then transmit a notification signal on all four resource elements in resource block $(m_2,n_2)$, as shown in FIG. 4. Terminals A and B may each detect collision of their peer discovery signal based on the notification signal transmitted by terminal C. Terminal C may also inform terminals A and B of the detected collision in resource block $(m_1,n_1)$ in other manners.

Transmitting terminals A and B may also use the null resource elements to detect for collision of their peer discovery signals. The collision detection by a transmitting terminal may be achieved in several manners.

In one design, a transmitting terminal may transmit its peer discovery signal on each resource element selected for use and may listen for peer discovery signals from other transmitting terminals on the null resource element. In the example shown in FIG. 4, during peer discovery frame t, terminal A may transmit its peer discovery signal on resource element 1 in resource block $(m_1,n_1)$ and may then listen for other peer discovery signals on null resource element 2. Terminal A may detect collision with other terminals (e.g., terminal B) if it obtains sufficiently high received power on null resource element 2.

If a collision is detected on null resource element 2, then terminal A may take corrective action, e.g., change to a different ID and/or use new parameter values for the hopping function and select different resource blocks in future peer discovery frames, etc. Terminal A may select different resource blocks using various means. For example, terminal A may monitor the received powers of all the resource blocks in the peer discovery frame and may select the resource block with least total received power.

If no collision is detected on null resource element 2, then terminal A may continue to transmit its peer discovery signal on resource elements 3 and 4. This design assumes that terminal A can obtain sufficiently high received power for terminal B on null resource element 2.

In another design, a transmitting terminal may transmit its peer discovery signal on each resource element selected for use and may listen for a notification signal from a receiving terminal on the null resource element. Referring back to FIG. 1, terminals A and B may be located sufficiently far apart, and each terminal may receive the peer discovery signal of the other terminal at relatively low received power. In this case, terminal A may obtain low received power for terminal B on a null resource element and may not detect collision based on the low received power for terminal B. However, terminal C may be located between terminals A and B, may obtain high received power for both terminals A and B, and may detect collision between terminals A and B. Terminal C may then transmit a notification signal on all resource elements in the next resource block $(m_2,n_2)$ used by terminal A. Terminal A may then obtain high received power on the null resource element in the next resource block from terminal C and may be able to detection collision with assistance from terminal C. Terminal A may then take corrective action. Terminal B may detect the collision in similar manner.

A transmitting or receiving terminal may detect for collision based on received powers of resource elements in a resource block. In one design, the terminal may identify the resource element in the resource block with the lowest received power. The terminal may then compare the lowest received power against a threshold and may declare that a collision has occurred if the lowest received power exceeds the threshold. The threshold may be a function of noise power, received power of at least one remaining resource element in the resource block, received powers of the other resource blocks in the peer discovery frame, etc.

A terminal may select a subset of resource elements in a resource block to transmit a peer discovery signal in various manners. In one design, the terminal may select the subset of resource elements based on a pseudo-random function. Equivalently, the terminal may select one or more null resource elements in the resource block based on the pseudo-random function. The subset of resource elements may then exclude the non-null resource element(s) in the resource block. In any case, the pseudo-random function may be seeded with an ID of the terminal, a frame index, and/or other information. Different terminals may select different subsets of resource elements with different seeds derived based on their IDs and/or other information. The terminal may also select the subset of resource elements in the resource block in other manners.

A terminal may transmit its peer discovery signal on a subset of resource elements in various manners. In one design, the terminal may encode and modulate information (e.g., the terminal ID) to send in the peer discovery signal and may obtain a sequence of modulation symbols, e.g., one modulation symbol for each resource element in a resource block. The terminal may then map each modulation symbol to a corresponding resource element if it is selected for use and may puncture or delete the modulation symbol if it is a null resource element. A receiving terminal may receive symbols on all resource elements in the resource block and may demodulate and decode the received symbols to recover the peer discovery signal. In this design, the receiving terminal may not need to know the location of the null resource element(s) in the resource block. In another design, the transmitting terminal may encode and modulate the information and obtain modulation symbols for the subset of resource elements selected for use. The terminal may then map each modulation symbol to a corresponding selected resource element. The terminal may also transmit its peer discovery signal in other manners.

The techniques for transmitting on a subset of resource elements in a resource block may be used to transmit peer discovery signals, as described above. The techniques may also be used to transmit other signals on shared resources. For example, the techniques may be used to transmit a random access signal to access a wireless network, a resource request signal to request for resources, etc. The techniques may be used to detect for collision, as described above.

For peer-to-peer communication, a first terminal may transmit a paging signal to a second terminal on shared resources, e.g., in a paging frame shown in FIG. 2. A paging signal may also be referred to as a page, a paging message, etc. The paging signal may be used to request the second terminal to establish communication with the first terminal, to send information to the second terminal, and/or for other purposes. In general, any number of terminals may simultaneously transmit paging signals on the shared resources. It is desirable to transmit the paging signals such that they can be correctly decoded with sufficiently high probability even if there are collisions.

Figure 5:
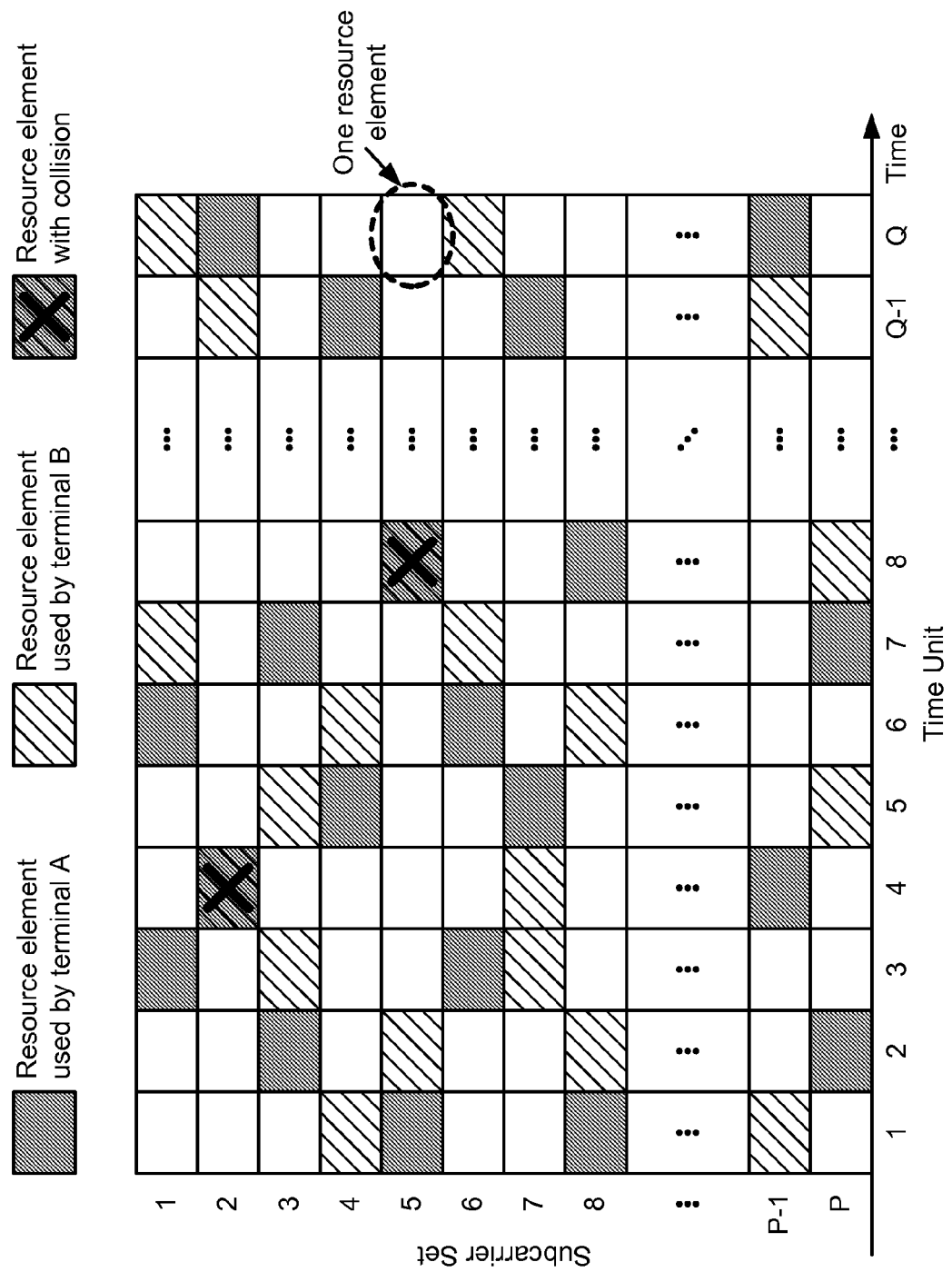
FIG. 5 shows an exemplary paging frame and transmission of paging signals by two terminals.

FIG. 5 shows a design of a paging frame that may be used to transmit paging signals. In this design, the paging frame may be partitioned into Q time units with indices of 1 through Q, where Q may be any integer value. Each time unit may include one or more symbol periods. P subcarrier sets with indices of 1 through P may be formed based on the K total subcarriers, where P may be any integer value equal to or less than K. Each subcarrier set may include one or more subcarriers.

Resource elements may be defined based on the available time and frequency units in the paging frame. In general, a resource element may have any dimension of time and frequency. In one design, a resource element may cover one subcarrier set in one time unit and may be identified by an index (p,q), which is composed of a subcarrier set index p and a time unit index q. In the design shown in FIG. 4, T=P*Q total resource elements are available in the paging frame.

In another aspect, a terminal may transmit a paging signal on a subset of resource elements in a paging frame. The terminal may select the subset of resource elements in a pseudo-random manner based on a function that is known to both the terminal transmitting the paging signal and a recipient terminal of the paging signal. Different terminals may pseudo-randomly select different subsets of resource elements. This may then mitigate the adverse effect due to collision when multiple terminals transmit their paging signals in the same paging frame.

FIG. 5 also shows exemplary transmission of paging signals by two terminals A and B in the same paging frame. As shown in FIG. 5, terminal A may pseudo-randomly select R resource elements among T available resource elements in the paging frame, where R may be a suitable value less than T. The R resource elements selected by terminal A may be distributed throughout the paging frame. Terminal A may transmit a paging signal on the R selected resource elements to terminal C.

Terminal B may also pseudo-randomly select R resource elements among the T available resource elements in the paging frame. Terminal B may transmit a paging signal on the R selected resource elements to terminal D. Some of the R resource elements selected by terminal B may also be selected by terminal A, as shown in FIG. 5. Terminals A and B would both transmit their paging signals on the commonly selected resource elements. Terminal C may receive the paging signal from terminal A and may observe interference from terminal B on the commonly selected resource elements. Similarly, terminal D may receive the paging signal from terminal B and may observe interference from terminal A on the commonly selected resource elements. However, the commonly selected resource elements may only be a subset of the R resource elements selected by each of terminals A and B. Terminal C may thus be able to correctly decode the paging signal from terminal A even with the interference from terminal B on the commonly selected resource elements. Similarly, terminal D may be able to correctly decode the paging signal from terminal B even with the interference from terminal A on the commonly selected resource elements.

Terminal C may determine received powers of the resource elements in the resource block and may identify resource elements that are used by terminal A but may be contaminated by interference from other terminals. In one design, terminal C may rank the received powers of all resource elements that are not used by terminal A for transmission. If there is no interference from other terminals, then the received powers of the unused resource elements may be close to a noise power level $P_N$. However, if the resource block is also used by another terminal B, then the received power of each resource element not used by terminal A may be close to $P_N$ if the resource element is also not used by terminal B or close to $P_B$ if the resource element is used by terminal B, where $P_B$ is the received power at terminal C for terminal B. If terminal A uses M-PSK (M-ary phase shift keying) for its paging signal, then the received powers at terminal C on resource elements used only by terminal A may be close to $P_A$ and the received powers at terminal C on resource elements used by both terminals A and B may be close to $P+P_B-P_N$. Terminal C may determine a threshold based on the received powers of all resource elements and may use the threshold to determine whether a resource element used by terminal A is contaminated by interference from terminal B. For example, if $P_N < P_B < P_A$, then terminal C may determine the threshold as follows:

$$P_{threshold} = P_A + \frac{P_B - P_N}{2},$$

where $P_{threshold}$ is the threshold.

Terminal C may compare the received power of each resource element used by terminal A against the threshold. If the received power of a resource element used by terminal A exceeds the threshold, then the resource element may be considered to be contaminated by terminal B. Terminal C may decode the paging signal sent by terminal A by treating received symbols from the contaminated resource elements as erasures.

A paging frame may be defined to include a sufficient total number of resource elements (T), which may be dependent on various factors such as the number of terminals expected to transmit paging signals in the paging frame, the amount of information to send in each paging signal, the expected worst-case channel conditions, etc. The number of resource elements (R) selected by a terminal may be determined based on various factors such as the amount of information to send in a paging signal by the terminal, the size of each resource element, the expected worst-case channel conditions, etc. The likelihood of collision on any given resource element may be dependent on the number of terminals expected to transmit paging signals in the paging frame, the number of resource elements selected by each terminal, and the total number of resource elements in the paging frame.

In one exemplary design, a paging frame covers 56 subcarrier sets in 14 time units and includes a total of 784 resource elements. Each subcarrier set includes one subcarrier, each time unit covers one symbol period, and each resource element corresponds to one subcarrier in one symbol period. A terminal selects 280 resource elements out of the 784 total resource elements. The paging frame and the resource elements may also have other dimensions. The total number of resource elements and the number of selected resource elements may also be different from the values given above.

A terminal may select R resource elements from among the T total resource elements in a paging frame in various manners. In one design, the terminal may pseudo-randomly select R different resource elements based on a pseudo-random function. In another design, the terminal may pseudo-randomly select a subset of the P subcarrier sets and a subset of the Q time units. The R resource elements may then be determined by the selected subcarrier sets and the selected time units. For the example described above with 56 subcarrier sets and 14 time units in a paging frame, the terminal may pseudo-randomly select 40 out of the 56 subcarrier sets and 7 out of the 14 time units. The 280 selected resource elements may then be determined by the 40 selected subcarrier sets and the 7 selected time units. The terminal may also select the R resource elements from among the T total resource elements in other manners.

In one design, a subset of resource elements may be selected based on a pseudo-random function that may be shared between a transmitting terminal and a receiving terminal of a paging message. In the example shown in FIG. 5, terminals A and C may share a pseudo-random function, and terminals B and D may share a pseudo-random function. In one design, a single pseudo-random function may be used by all terminals, and a seed may be defined by the transmitting and receiving terminals, e.g., by the IDs of these terminals. In this design, different terminals may use different subsets of resource elements to transmit paging signals to a given terminal X. Terminal X may detect for a paging signal from each peer terminal on the subset of resource elements usable by that peer terminal. This design may allow multiple terminals to simultaneously transmit paging signals to terminal X on different subsets of resource elements in the same paging frame. This design may also avoid the need for collision detection of the paging signals.

In another design, a subset of resource elements may be selected based on a pseudo-random function applicable for a receiving terminal. In one design, a single pseudo-random function may be used by all terminals, and a seed may be defined by the receiving terminal, e.g., by the receiving terminal ID. In this design, a given terminal X may listen for paging signals transmitted by other terminals to terminal X on the subset of resource elements usable for terminal X. This design may simplify receiver operation since terminal X only needs to detect for paging signals on one subset of resource elements in each paging frame. Multiple terminals may transmit paging signals to terminal X on the same subset of resource elements in a given paging frame. A scheme may be used to detect for collision. For example, if terminal Y transmits a paging signal to terminal X and does not receive a response, then terminal Y may assume that a collision has occurred and may wait a pseudo-random amount of time before re-transmitting the paging signal to terminal X.

A subset of resource elements may also be selected in other manners. There may be collision on some of the selected resource elements. However, the collision may be pseudo-random, and a receiving terminal may still be able to correctly decode a paging signal even with interference on some resource elements. Different terminals may interfere with one another, albeit to a lesser extent.

The techniques of transmitting on a subset of resource elements in a frame may be used to transmit paging signals, as described above. The techniques may also be used to transmit other signals on shared resources. For example, the techniques may be used to transmit a random access signal to access a wireless network, a resource request signal to request for resources, etc. The techniques may be used to mitigate the effects of collision, as described above.

FIG. 6 shows a design of a process 600 for transmitting a signal in a wireless communication network. Process 600 may be performed by a terminal (as described below) or by some other entity. The terminal may determine a resource block to use for transmission of a signal by the terminal (block 612). The resource block may comprise multiple resource elements, and each resource element may be a time and frequency unit. The terminal may select a subset of the multiple resource elements in the resource block (block 614). The terminal may transmit the signal on the selected subset of resource elements in the resource block (block 616). The terminal may transmit no signal on at least one null resource element in the resource block (block 618). The at least one null resource element may be omitted from the selected subset of resource elements and may be used for detecting collision of the signal.

The terminal may transmit the signal to at least one other terminal for peer-to-peer communication. In one design, the signal may comprise a peer discovery signal indicating the presence of the terminal. The terminal may periodically transmit the peer discovery signal on different subsets of resource elements in different resource blocks in different frames, e.g., as described above. In another design, the signal may comprise a paging signal transmitted by the terminal to page another terminal.

In one design, the terminal may determine received power of the at least one null resource element. The terminal may determine whether collision of the signal has occurred based on the received power of the at least one null resource element. For example, the terminal may compare the received power of the at least one null resource element against a threshold and may determine that collision of the signal has occurred if the received power exceeds the threshold.

In one design of resource block selection, the terminal may select the resource block from among a plurality of resource blocks based on an ID, e.g., the terminal ID. The terminal may change the ID if collision of the signal is detected in the resource block. In one design of resource element selection, the terminal may select resource elements in the selected subset of resource elements from among the multiple resource elements in the resource block based on a function of an ID and time. In another design of resource element selection, the resource block may comprise P subcarrier sets in Q time units, where P and Q may be greater than one. The terminal may select a subset of the P subcarrier sets, select a subset of the Q time units, and determine the subset of resource elements based on resource elements defined by the selected subset of subcarrier sets and the selected subset of time units. The terminal may also select resource blocks and resource elements in other manners.

FIG. 7 shows a design of an apparatus 700 for transmitting a signal in a wireless communication network. Apparatus 700 includes a module 712 to determine a resource block to use for transmission of a signal by a terminal, the resource block comprising multiple resource elements, each resource element being a time and frequency unit, a module 714 to select a subset of the multiple resource elements in the resource block, a module 716 to transmit the signal on the selected subset of resource elements in the resource block, and a module 718 to transmit no signal on at least one null resource element in the resource block, the at least one null resource element being omitted from the selected subset of resource elements and used for detecting collision of the signal.

FIG. 8 shows a design of a process 800 for receiving a signal in a wireless communication network. Process 800 may be performed by a terminal (as described below) or by some other entity. The terminal may determine a resource block usable for transmission of a signal to be detected (block 812). The resource block may comprise multiple resource elements, and each resource element may be a time and frequency unit. The signal may comprise a peer discovery signal, a paging signal, etc. The terminal may determine received powers of the multiple resource elements in the resource block (block 814). The terminal may detect for the signal based on the received powers of the multiple resource elements (block 816).

The terminal may determine whether collision of the signal has occurred based on the received powers of the multiple resource elements (block 818). In one design, the terminal may determine the smallest received power among the received powers of the multiple resource elements in the resource block. The terminal may also determine a threshold based on received power of at least one resource element in the resource block. The terminal may then determine whether collision of the signal has occurred based on the smallest received power and the threshold. The terminal may transmit a notification signal if collision of the signal has occurred in the resource block. The terminal may recover the signal (e.g., a peer discovery signal) based on received symbols from the resource block if the signal is detected and no collision of the signal has occurred (block 820).

FIG. 9 shows a design of an apparatus 900 for receiving a signal in a wireless communication network. Apparatus 900 includes a module 912 to determine a resource block usable for transmission of a signal to be detected, the resource block comprising multiple resource elements, each resource element being a time and frequency unit, a module 914 to determine received powers of the multiple resource elements in the resource block, a module 916 to detect for the signal based on the received powers of the multiple resource elements, a module 918 to determine whether collision of the signal has occurred based on the received powers of the multiple resource elements, and a module 920 to recover the signal based on received symbols from the resource block if the signal is detected and no collision of the signal has occurred (block 920).

FIG. 10 shows a design of a process 1000 for receiving a signal in a wireless communication network. Process 1000 may be performed by a terminal (as described below) or by some other entity. The terminal may determine a resource block usable for transmission of a signal to be detected (block 1012). The resource block may comprise multiple resource elements, and each resource element may be a time and frequency unit. The signal may comprise a peer discovery signal, a paging signal, etc. The terminal may determine a subset of the multiple resource elements in the resource block usable for the signal, e.g., based on an ID of the terminal (block 1014).

The terminal may identify resource elements with high interference in the subset of resource elements (block 1016). In one design, the terminal may determine whether each resource element in the subset of resource elements has high interference based on the received power of the resource element and a threshold. The terminal may determine the threshold based on received powers of the multiple resource elements in the resource block. The terminal may process resource elements without high interference in the subset of resource elements to recover the signal (block 1018). In one design, the terminal may decode received symbols from the resource elements without high interference and erasures for the resource elements with high interference to recover a paging signal.

FIG. 11 shows a design of an apparatus 1100 for receiving a signal in a wireless communication network. Apparatus 1100 includes a module 1112 to determine a resource block usable for transmission of a signal to be detected, the resource block comprising multiple resource elements, each resource element being a time and frequency unit, a module 1114 to determine a subset of the multiple resource elements in the resource block usable for the signal, a module 1116 to identify resource elements with high interference in the subset of resource elements, and a module 1118 to process resource elements without high interference in the subset of resource elements to recover the signal.

The modules in FIGS. 7, 9 and 11 may comprise processors, electronics devices, hardware devices, electronics components, logical circuits, memories, etc., or any combination thereof.

Figure 12:
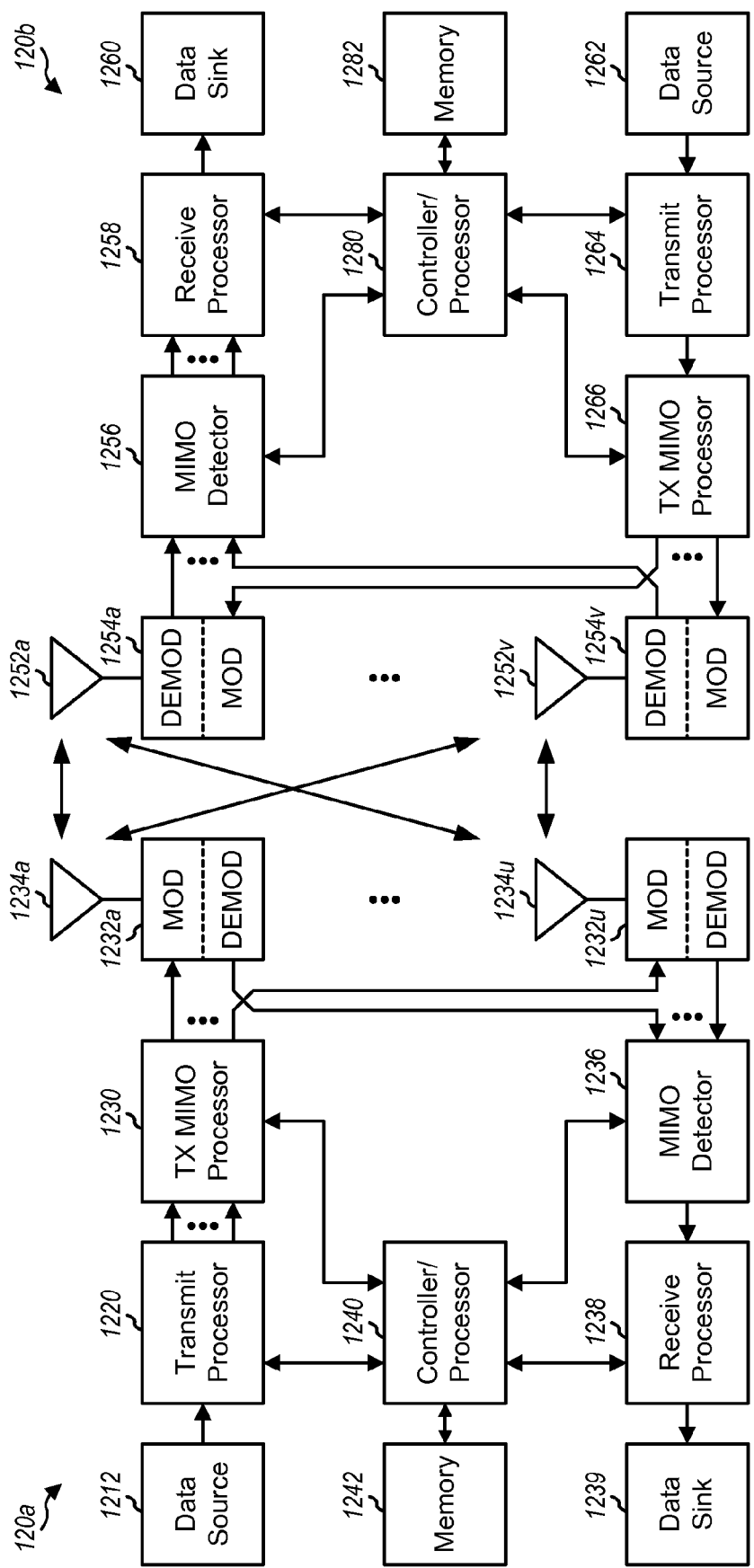
FIG. 12 shows a design of two terminals.

FIG. 12 shows a block diagram of a design of terminals 120a and 120b, which are two terminals in wireless network 100 in FIG. 1. In this design, terminal 120a is equipped with U antennas 1234a through 1234u, and terminal 120b is equipped with V antennas 1252a through 1252v, where in general U≥1 and V≥1.

At terminal 120a, a transmit processor 1220 may receive data from a data source 1212 and control information from a controller/processor 1240. The control information may comprise a terminal ID, information to send in a peer discovery signal, information to send in a paging signal, etc. Transmit processor 1220 may process (e.g., encode, interleave, and modulate) the data and control information and provide data symbols and control symbols, respectively. A transmit (TX) multiple-input multiple-output (MIMO) processor 1230 may perform spatial processing (e.g., preceding) on the data symbols, the control symbols, and/or pilot symbols, if applicable, and may provide U output symbol streams to U modulators (MODs) 1232a through 1232u. Each modulator 1232 may process a respective output symbol stream (e.g., for OFDM, SC-FDM, etc.) to obtain an output sample stream. Each modulator 1232 may further process (e.g., convert to analog, amplify, filter, and upconvert) the output sample stream to obtain a radio frequency (RF) signal. U RF signals from modulators 1232a through 1232u may be transmitted via U antennas 1234a through 1234u, respectively.

At terminal 120b, antennas 1252a through 1252v may receive the RF signals from terminal 120a and may provide received signals to demodulators (DEMODs) 1254a through 1254v, respectively. Each demodulator 1254 may condition (e.g., filter, amplify, downconvert, and digitize) a respective received signal to obtain input samples. Each demodulator 1254 may further process the input samples (e.g., for OFDM, SC-FDM, etc.) to obtain received symbols. A MIMO detector 1256 may obtain received symbols from all V demodulators 1254a through 1254v, perform MIMO detection on the received symbols if applicable, and provide detected symbols. A receive processor 1258 may process (e.g., demodulate, deinterleave, and decode) the detected symbols, provide decoded data to a data sink 1260, and provide decoded control information to a controller/processor 1280.

At terminal 120b, data from a data source 1262 and control information from controller/processor 1280 may be processed by a transmit processor 1264, precoded by a TX MIMO processor 1266 if applicable, further processed by modulators 1254, and transmitted via antennas 1252. At terminal 120a, the RF signals from terminal 120b may be received by antennas 1234, processed by demodulators 1232, detected by a MIMO detector 1236 if applicable, and further processed by a receive processor 1238 to obtain the decoded data and control information transmitted by terminal 120b.

Each terminal 120 may generate and transmit a peer discovery signal, a paging signal, and/or other signals, e.g., using transmit processor 1220, TX MIMO processor 1230, and modulators 1232 at terminal 120a. Each terminal 120 may also detect for peer discovery signals, paging signals, and/or other signals from other terminals, e.g., using demodulators 1252, MIMO detector 1256, and receive processor 1258 at terminal 120b. Each terminal 120 may also receive and process signals from base stations and/or other transmitter stations for communication and/or to obtain timing information.

Controllers/processors 1240 and 1280 may direct the operation at terminals 120a and 120b, respectively. Processors 1240 and 1280 and/or other processors and modules at each terminal may perform or direct process 600 in FIG. 6, process 800 in FIG. 8, process 1000 in FIG. 10, and/or other processes for the techniques described herein. Memories 1242 and 1282 may store data and program codes for terminals 120a and 120b, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a resource block to use for transmission of a signal by a terminal, the resource block comprising multiple resource elements, each resource element being a time and frequency unit;
   selecting a subset of the multiple resource elements in the resource block;
   transmitting the signal on the selected subset of resource elements in the resource block, wherein the signal is transmitted from the terminal to at least one other terminal for peer-to-peer communication; and
   transmitting no signal on at least one null resource element in the resource block, the at least one null resource element being omitted from the selected subset of resource elements and used for detecting collision of the signal.

2. The method of claim 1, wherein the signal comprises a peer discovery signal indicating presence of the terminal.

3. The method of claim 2, further comprising:
   periodically transmitting the peer discovery signal on different subsets of resource elements in different resource blocks in different frames.

4. The method of claim 1, wherein the signal comprises a paging signal transmitted by the terminal to page another terminal.

5. The method of claim 1, further comprising:
   determining received power of the at least one null resource element; and
   determining whether collision of the signal has occurred based on the received power of the at least one null resource element.

6. The method of claim 5, wherein the determining whether collision of the signal has occurred comprises:
   comparing the received power of the at least one null resource element against a threshold, and
   determining collision of the signal has occurred if the received power exceeds the threshold.

7. The method of claim 1, wherein the determining the resource block comprises selecting the resource block from among a plurality of resource blocks based on an identifier.

8. The method of claim 7, further comprising:
   changing the identifier if collision of the signal is detected in the resource block.

9. The method of claim 1, wherein the selecting a subset of the multiple resource elements in the resource block comprises selecting resource elements in the selected subset of resource elements from among the multiple resource elements in the resource block based on a function of an identifier and time.

10. The method of claim 1, wherein the resource block comprises P subcarrier sets in Q time units, where P and Q are greater than one, and wherein the selecting a subset of the multiple resource elements in the resource block comprises:
    selecting a subset of the P subcarrier sets,
    selecting a subset of the Q time units, and
    determining the subset of resource elements based on resource elements defined by the selected subset of subcarrier sets and the selected subset of time units.

11. An apparatus for wireless communication, comprising:
    at least one processor configured to determine a resource block to use for transmission of a signal by a terminal, the resource block comprising multiple resource elements, each resource element being a time and frequency unit, to select a subset of the multiple resource elements in the resource block, to send the signal on the selected subset of resource elements in the resource block, wherein the signal is sent from the terminal to at least one other terminal for peer-to-peer communication, and to send no signal on at least one null resource element in the resource block, the at least one null resource element being omitted from the selected subset of resource elements and used for detecting collision of the signal.

12. The apparatus of claim 11, wherein the signal comprises a peer discovery signal indicating presence of the terminal, and wherein the at least one processor is configured to periodically send the peer discovery signal on different subsets of resource elements in different resource blocks in different frames.

13. The apparatus of claim 11, wherein the at least one processor is configured to determine received power of the at least one null resource element, and to determine whether collision of the signal has occurred based on the received power of the at least one null resource element.

14. The apparatus of claim 11, wherein the at least one processor is configured to select the resource block from among a plurality of resource blocks based on an identifier, and to change the identifier if collision of the signal is detected in the resource block.

15. The apparatus of claim 11, wherein the at least one processor is configured to select resource elements in the selected subset of resource elements from among the multiple resource elements in the resource block based on a function of an identifier and time.

16. An apparatus for wireless communication, comprising:
    means for determining a resource block to use for transmission of a signal by a terminal, the resource block comprising multiple resource elements, each resource element being a time and frequency unit;
    means for selecting a subset of the multiple resource elements in the resource block;
    means for transmitting the signal on the selected subset of resource elements in the resource block, wherein the signal is transmitted from the terminal to at least one other terminal for peer-to-peer communication; and
    means for transmitting no signal on at least one null resource element in the resource block, the at least one null resource element being omitted from the selected subset of resource elements and used for detecting collision of the signal.

17. The apparatus of claim 16, wherein the signal comprises a peer discovery signal indicating presence of the terminal, the apparatus further comprising:
    means for periodically transmitting the peer discovery signal on different subsets of resource elements in different resource blocks in different frames.

18. The apparatus of claim 16, further comprising:
    means for determining received power of the at least one null resource element; and
    means for determining whether collision of the signal has occurred based on the received power of the at least one null resource element.

19. The apparatus of claim 16, wherein the means for determining the resource block comprises:
    means for selecting the resource block from among a plurality of resource blocks based on an identifier, and
    means for changing the identifier if collision of the signal is detected in the resource block.

20. The apparatus of claim 16, wherein the means for selecting a subset of the multiple resource elements in the resource block comprises means for selecting resource elements in the selected subset of resource elements from among the multiple resource elements in the resource block based on a function of an identifier and time.

21. A computer program product, comprising:
a non-transitory computer-readable medium comprising:
code for causing at least one computer to determine a resource block to use for transmission of a signal by a terminal, the resource block comprising multiple resource elements, each resource element being a time and frequency unit,
code for causing at least one computer to select a subset of the multiple resource elements in the resource block,
code for causing at least one computer to send the signal on the selected subset of resource elements in the resource block, wherein the signal is sent from the terminal to at least one other terminal for peer-to-peer communication, and
code for causing at least one computer to send no signal on at least one null resource element in the resource block, the at least one null resource element being omitted from the selected subset of resource elements and used for detecting collision of the signal.

22. A method for wireless communication, comprising:
determining a resource block usable for transmission of a signal to be detected, wherein the signal is transmitted from a terminal to at least one other terminal for peer-to-peer communication, the resource block comprising multiple resource elements, each resource element being a time and frequency unit;
determining received powers of the multiple resource elements in the resource block;
detecting for the signal based on the received powers of the multiple resource elements; and
determining whether collision of the signal has occurred based on the received powers of the multiple resource elements.

23. The method of claim 22, wherein the determining whether collision of the signal has occurred comprises:
determining a smallest received power among the received powers of the multiple resource elements in the resource block, and
determining whether collision of the signal has occurred based on the smallest received power and a threshold.

24. The method of claim 23, wherein the determining whether collision of the signal has occurred further comprises determining the threshold based on received power of at least one resource element in the resource block.

25. The method of claim 22, further comprising:
recovering a peer discovery signal based on received symbols from the resource block if the signal is detected and no collision of the signal has occurred.

26. The method of claim 22, further comprising:
transmitting a notification signal if collision of the signal has occurred in the resource block.

27. An apparatus for wireless communication, comprising:
at least one processor configured to determine a resource block usable for transmission of a signal to be detected, wherein the signal is transmitted from a terminal to at least one other terminal for peer-to-peer communication, the resource block comprising multiple resource elements, each resource element being a time and frequency unit, to determine received powers of the multiple resource elements in the resource block, to detect for the signal based on the received powers of the multiple resource elements, and to determine whether collision of the signal has occurred based on the received powers of the multiple resource elements.

28. The apparatus of claim 27, wherein the at least one processor is configured to determine a smallest received power among the received powers of the multiple resource elements in the resource block, and to determine whether collision of the signal has occurred based on the smallest received power and a threshold.

29. The apparatus of claim 27, wherein the at least one processor is configured to recover a peer discovery signal from the resource block if the signal is detected and no collision of the signal has occurred.

30. The apparatus of claim 27, wherein the at least one processor is configured to send a notification signal if collision of the signal has occurred in the resource block.

* * * * *